United States Patent Office
2,862,256
Patented Dec. 2, 1958

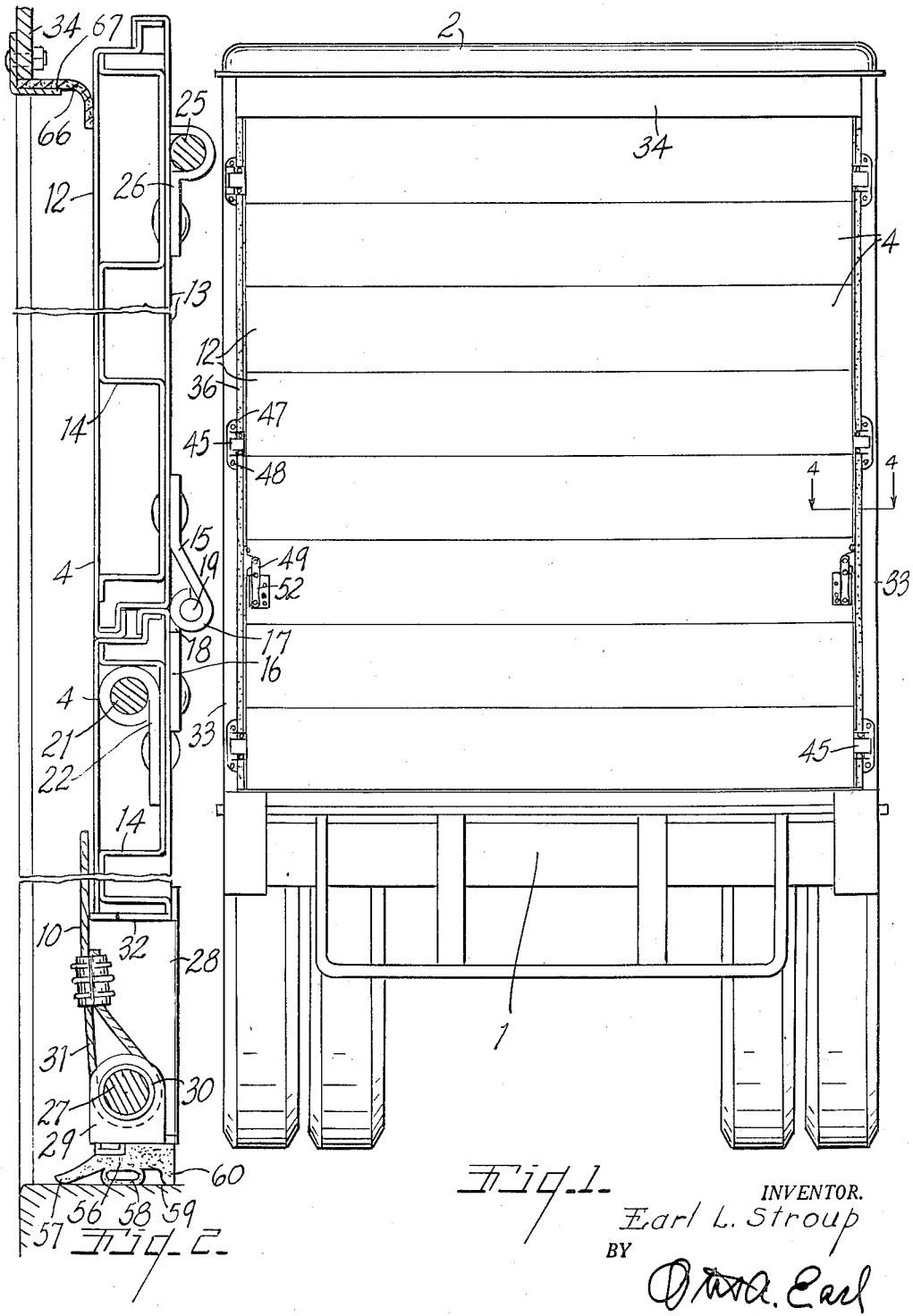

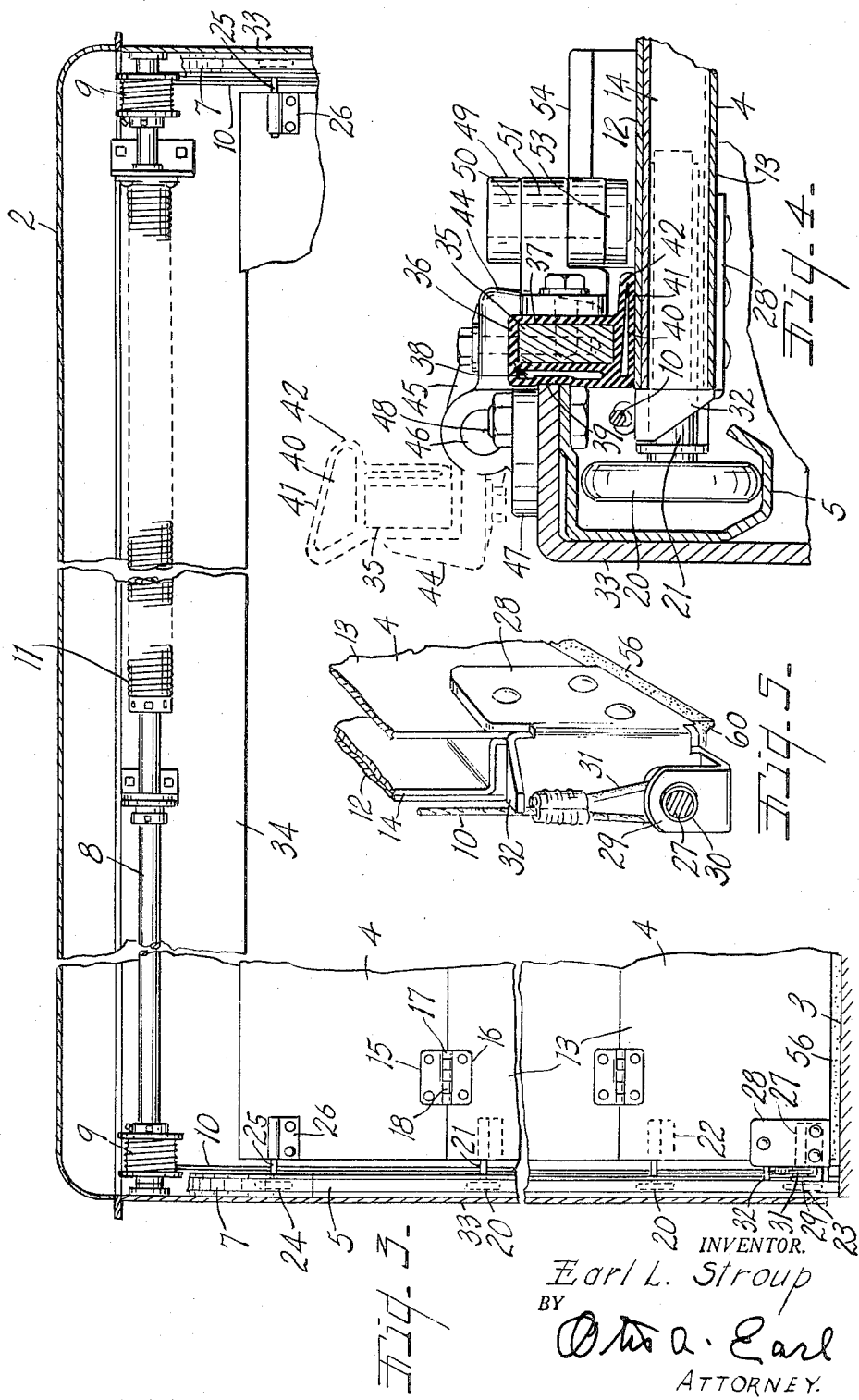

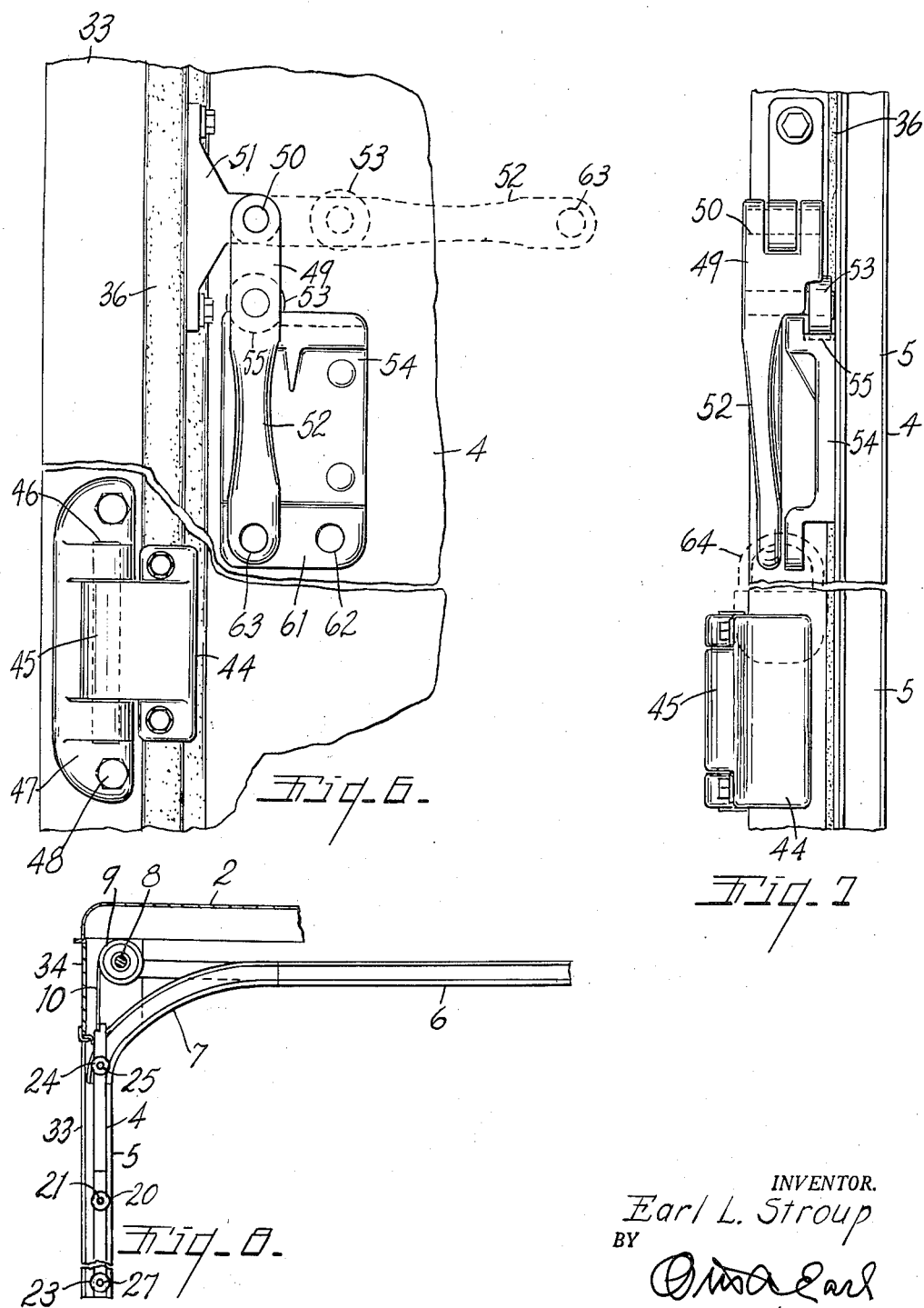

2,862,256

WEATHER SEALS FOR SLIDABLE CLOSURE ASSEMBLIES

Earl L. Stroup, Hartford City, Ind., assignor to Overhead Door Corporation, Hartford City, Ind.

Application December 12, 1955, Serial No. 552,348

16 Claims. (Cl. 20—19)

This invention relates to weather seals for slidable door assemblies such, for example, as upwardly acting doors of the sectional type and one which is well adapted for use in trailers, trucks, freight cars and the like.

The main objects of this invention are:

First, to provide an upwardly acting door assembly which is adapted for embodiment in trailers, trucks, refrigerator cars and the like having an effective weather seal for the doors in closed position, the weather seal being adjustable in inoperative position to permit free manipulation of the door without frictional resistance from the weather seal and without wear on the weather seal.

Second, to provide a structure embodying these advantages in which a single seal member serves to close the space between the movable closure member and the adjacent frame member, and when the seal member is in retracted position and permits the manipulation of the closure member entirely free from the seal member.

Third, to provide a closure assembly having these advantages in which the seal members may be very quickly operated to and from sealing position and one which is not likely to become inoperative as a result of the accumulation of ice and dirt such as might, for example, occur when the seal is embodied in a mobile vehicle such as a truck.

Fourth, to provide weather seals which can be completed as assembled units and installed as units.

Fifth, to provide an upwardly acting door assembly in which the door comprises a plurality of hingedly connecting sections associated with tracks with side seal members which are common to all of the sections when the door is in closed position.

Objects relating to details and economies of the invention will appear from the description to follow. The invention is defined and pointed out in the claims.

A preferred embodiment of the invention is illustrated in the accompanying drawing, in which:

Fig. 1 is a rear elevational view of a truck embodying a door assembly of my invention.

Fig. 2 is a fragmentary view partially in vertical section of the door assembly of Fig. 1.

Fig. 3 is a fragmentary inside view of the door assembly, the truck body being shown in transverse section.

Fig. 4 is an enlarged fragmentary view on a line corresponding to line 4—4 of Fig. 1 with the seal member in closed position, its retracted or open position being indicated by dotted lines.

Fig. 5 is an enlarged fragmentary perspective view of the bottom section of the door illustrating a cable attaching bracket of this invention.

Fig. 6 is a fragmentary outside view with the weather seal latch shown engaged with the keeper in full lines and in disengaged position by dotted lines.

Fig. 7 is a fragmentary view viewed from the right of Fig. 6.

Fig. 8 is a fragmentary sectional view illustrating details of the track, parts being shown mainly in conventional form.

In the accompanying drawing the invention is illustrated as embodied in a truck or trailer structure designated generally by the numeral 1, the housing 2 and the bed 3 being conventionally shown. In the structure illustrated the door is at the rear.

The upwardly acting door is of the sectional type comprising a plurality of hingedly connected sections 4. The door is slidable in the track conventionally illustrated in Fig. 8 which comprise upright portions 5, horizontal portions 6 and intermediate curved portions 7 merging into the upright and the horizontal portions.

In the embodiment illustrated the door is desirably spring counterbalanced, the shaft 8 being provided with drums 9 for the cables 10, the counterbalancing spring 11 being mounted on the shaft. Details of the counterbalance as such form no part of my invention except as to the relation of the cables to other parts and the connection for the cables to the bottom door section which connection will be hereinafter described.

In the embodiment illustrated the door sections 4 are formed of metal and comprise outer panels 12, inner panels 13 and corrugated reinforcing members 14 arranged between the panels. The adjacent sections are hingedly connected, the hinge members 15 being secured adjacent the lower edges of the panels while the coacting hinge members 16 are secured to the adjacent lower panels. The hinge members 15 have inwardly inclined arm like portions terminating in inturned knuckles 17 while the hinge members 16 have coacting knuckles 18 receiving the hinge pins or pintles 19. The door structure as such is the subject matter of a concurrently pending application of the applicant and is therefore not further described in this application.

The door sections are provided with track engaging rollers 20, the pintles 21 of which supported by brackets 22 arranged within the adjacent lower sections of the upper edges of the hingedly connected pairs of sections. The bottom section also has rollers 23 arranged adjacent its bottom edge. The top section has rollers 24 arranged adjacent its upper edge. The pintles 25 of these upper rollers are supported by brackets 26 disposed on the inner side of the section as shown in Fig. 2 while the pintles 27 of the lower rollers 23 are mounted on the cable attaching fixtures 28. These fixtures have upwardly facing angled arms 29, these arms and the adjacent walls of the fixtures or bracket 28 support the bearing sleeves 30 for the pintle 27. The cables 10 are engaged with these bearing sleeves as is clearly illustrated in Figs. 2 and 5.

A second arm 32 projects from the bracket 28 in front of the cable to limit or prevent forward swinging movement of the cable as is shown in Fig. 5. This arrangement of the hinges and rollers provide for relatively smooth inner supports and bracket surface for the door.

The hinge arms 15 with their inwardly inclined knuckle arms readily slide past any load that may contact the door. While it is not desirable or intended that the load of the truck be supported by the door it frequently happens that portions of the load may shift against the inner side of the door and therefore it is important that the inner side be relatively smooth. The inclined knuckle arms of the hinge member 15 readily slide past the load which may be in contact with the door.

The door opening is defined by vertical side frame members 33, top member 34 and the bottom of the truck 3 a portion of which serves as a door sill. It will be appreciated that mobile vehicles such as trucks, trailers, railway cars or the like are subjected to various conditions including rain, snow, sleet and dust. It is highly important that the inside of the vehicle be protected and the primary object of my present invention is to provide effective seals for the door. I desire however to point out that the weather seals of my invention are adapted for use in many other relations than vehicles.

The weather seal of my invention as illustrated in the accompanying drawing comprises a bar like elongated body member 35 and a flexible resilient seal element designated generally by the numeral 36 which is fixedly mounted on the body member. The seal member 36 is of a flexible resilient molded material and includes an elongated chamber 37, the walls of which closely embrace the body member as illustrated in Fig. 4. The seal member has a chamber 38 extending longitudinally thereof, the outer wall 39 of this chamber being resiliently flexible and constituting a sealing portion which coacts with the edge of the adjacent door frame member.

The seal element is provided with a second longitudinally extending chamber 40, the outer wall 41 of which provides a yielding seal portion coacting with the outer side of the door as is shown in Fig. 4 in which the seal member is shown in closed position by full lines and in open or retracted position by dotted lines.

The wall of the chamber 40 is so disposed that the wall 41 normally lies at an angle or is inclined relative to the plane of the body member as is illustrated by dotted lines in Fig. 4. The walls of the chamber 40 are conformed to provide a laterally projecting nose portion 42, that is, it projects laterally relative to the body member. The purpose of this is to get a relatively wide flexible sealing engagement of the seal member with the side of the door and also to minimize sliding frictional engagement as the seal member is swung to and from sealing position. In other words, the seal member has a flexing engagement with the door rather than a mere sliding frictional engagement.

Arm like hinge members 44 for the seal member are provided, the hinge member knuckles 45 which receive the pintles 46 carried by the hinge members 47 are fixedly secured to the outer sides of the side frame member 33 as by bolts or screws 48. The seal members are thus supported for swinging movement so that they may be swung to retracted position as shown by dotted lines in Fig. 4 clearing the door opening or may be swung to closed position as illustrated in full lines in Fig. 4.

The latches 49 are pivotally mounted at 50 on the brackets 51 secured to the seal members, the latches having handholds or grips 52 for convenience in manipulation. The latches are provided with rollers 53 spaced from their pivots 50 and adapted to cammingly engage the keepers 54 on the door. These keepers are provided with recesses 55 with which the rollers 53 engage when the latches are in seal closing position. This camming engagement of the rollers with the keepers imparts a down thrust on the door thereby urging the seal members 56 downwardly upon the sill which in this embodiment illustrated is a part of the bed of the vehicle. The seal member 56 has a lip portion 57 projecting outwardly from its front edge, the chamber 58 in its underside providing a flexible sill engaging wall 59 and a rib 60 on its inner edge. This bottom seal member extends the full width of the bottom section of the door, that is, it extends below the brackets 28 as is illustrated in Fig. 5. This arrangement insures an effective sealing engagement of the bottom seal with the sill portion of the truck bed.

It is sometimes desired to lock the door in closed position and to that end the keeper is provided with an outwardly offset flange 61 at its lower end provided with holes 62, the latches being provided with the holes 63 aligned with the holes 62 when the latches are in keeper engaged position so that a hasp of a padlock, as is indicated at 64, may be inserted through the aligned holes.

The keeper illustrated has two roller engaging recesses and two holes so that the keepers may be installed on either side of the door. In the foregoing I have mainly referred to a single seal member but it will be understood that two seal members are used, one for each vertical edge of the door.

A seal member 66 is provided for the top section, this seal member being a flexible strip of substantial width and is secured to the top door frame member 34 by the strip 67 of angle section so that a free edge portion projects to be engaged by the door when it is in closed position as is shown in Fig. 2. With this arrangement of parts a highly effective seal is provided and one which permits free operation of the door when the side seal members are retracted. Another advantage is that the side seal members are effective under adverse conditions such as the accumulation of dirt and substantial amounts of snow and ice. Also, the flexible resilience of the sealing parts permits them to be readily freed from the parts engaged thereby.

I have not attempted to illustrate and describe various modifications and adaptations which I contemplate. The structure illustrated is highly desirable for upwardly acting sectional door structures such as is illustrated. The side seal members extend the full height of the door and this avoids the necessity of providing a sectional seal member for each door section. The seal units of my invention are however adapted for use on various types of closures, particularly slidable closures.

Having thus described the invention, what is claimed as new and is desired to be secured by Letters Patent is:

1. An upwardly acting door assembly comprising side frame members and a sill member, a door, tracks disposed vertically on the inner side of said frame members, said door being provided with rollers coacting with the tracks to slidably support the door, door seal members, each comprising an elongated bar-like body member and an elongated seal element of resiliently flexible material supportedly mounted on said body member, said seal element having a first resiliently flexible portion which resiliently engages the edge of the adjacent side frame member when the seal member is in closed position, said seal element also having a second resiliently flexible portion which engages the outer side of the door when the door and seal members are in closed position, hinge members for said seal members swingably mounted on the outer sides of the said side frame members whereby the seal members may be swung outwardly to open position at the outer sides of the side frame members or to closed position with their said walls in sealing engagement with the door frame side members and the door, a compressible seal member mounted on the lower edge of the door to coact with the door sill member when the door is closed, keepers mounted on the door, and latches mounted on said door seal members to be engaged by said keepers.

2. An upwardly acting door assembly comprising side frame members and a sill member, a door, tracks disposed vertically on the inner side of said frame members, said door being provided with rollers coacting with the tracks to slidably support the door, door seal members, each comprising an elongated bar-like body member and an elongated seal element of resiliently flexible material supportedly mounted on said body member, said seal element having a first resiliently flexible portion which resiliently engages the laterally facing edge of the adjacent side frame members when the seal member is in closed position, said seal element also having a second resiliently flexible portion which engages the outer side of the door when the door and seal members are in closed position, hinge members for said seal members swingably mounted on the outer sides of the said side frame members whereby the seal members may be swung outwardly to open position at the outer sides of the side frame members or to closed position with their said walls in sealing engagement with the door frame side members and the door.

3. An upwardly acting door assembly comprising side frame members and a sill member, a door slidably associated with said frame members, door seal members swingably mounted on said frame members and each comprising an elongated body member, an elongated seal element supportedly mounted on said body member and having a first longitudinally extending chamber having a flexibly resilient outer wall and a second longitudinally extending chamber having a flexible resilient outer wall disposed at an angle to said first wall and to the body member and having a resiliently flexible lip like portion extending laterally of the body member, said first wall of said seal members being in engagement with the door side frame members and said second wall of said seal members being in engagement with the door when the door and seal members are in closed position, a compressible seal member mounted on the lower edge of the door to coact with the door sill member when the door is closed, latches mounted on said door seal members, and keepers mounted on said door and with which said latches have down thrust engagement, said keepers and latches having aligned openings therein adapted to receive lock elements when the latches are in engaged position.

4. An upwardly acting door assembly comprising side frame members and a sill member, a door slidably associated with said frame members, door seal members swingably mounted on said frame members and each comprising an elongated body member, an elongated seal element supportedly mounted on said body member and having a first longitudinally extending chamber having a flexibly resilient outer wall and a second longitudinally extending chamber having a flexible resilient outer wall disposed at an angle to said first wall and to the body member and having a resiliently flexible lip like portion extending laterally of the body member, said first wall of said seal members being in engagement with the door side frame members and said second wall of said seal members being in engagement with the door when the door and seal members are in closed position, latches mounted on said door seal members, and keepers mounted on said door, said keepers and latches being adapted to receive lock elements when the latches are in engaged position.

5. The combination with a relatively fixed frame member and a closure member slidably associated therewith, a seal member comprising an elongated relatively rigid body member and a seal element supportedly mounted on said body member, and having a first longitudinally extending resiliently flexible portion which engages the frame member when the seal member is in closed position, said seal element having a second longitudinally extending flexibly resilient portion which engages the adjacent side of the closure member when the seal member is in closed position, means swingably mounting said seal member on said frame member whereby the seal member may be swung to open position or to closed position with its said flexible portions in engagement with said frame member and the closing member as aforesaid, a latch mounted on said seal member, and a keeper mounted on the closure members with which said latch engages when the latch is in locking position, said keeper and latch being adapted to receive a lock element when the latch is in keeper engaging position.

6. The combination with a relatively fixed frame member and a closure member slidably associated therewith, a seal member comprising an elongated relatively rigid body member and a seal element supportedly mounted on said body member, and having a first longitudinally extending resiliently flexible portion which engages the frame member when the seal member is in closed position, said seal element having a second longitudinally extending flexibly resilient portion which engages the adjacent side of the closure member when the seal member is in closed position, means swingably mounting said seal member on said frame member whereby the seal member may be swung to open position or to closed position with its said flexible portions in engagement with said frame member and the closing member as aforesaid, a latch mounted on said seal member, and a keeper mounted on the closure members with which said latch engages when the latch is in locking position.

7. The combination with a relatively fixed frame member and a closure member slidably associated therewith, a seal member comprising an elongated relatively rigid body member and a seal element supportedly mounted on said body member, and having a first longitudinally extending resiliently flexible portion which engages the frame member when the seal member is in closed position, said seal element having a second longitudinally extending flexibly resilient portion which engages the adjacent side of the closure member when the seal member is in closed position, means swingably mounting said seal member on said frame member whereby the seal member may be swung bodily about an axis located externally of said body and said flexible portions to open position or to closed position with its said flexible portions in engagement with said frame member and the closing member as aforesaid.

8. A door assembly comprising side frame members and a sill member, tracks disposed at the inner sides of said side frame members and in laterally spaced relation to the inner edges thereof, a door slidably associated with said tracks, manually adjustable seal members comprising relatively rigid body elements and resilient side frame member and door seal elements supportedly mounted thereon, said seal members being pivotally mounted on the outer sides of said side frame members so that they may be swung outwardly in clearance relation to the opening between said side frame members or to be swung inwardly into the opening and into sealing engagement with the opposed edges of the door frame members and with the door when it is in closed position, a compressible sill seal member mounted on the lower edge of the door to coact with the door sill when the door is closed, latches provided with handles constituting handles for swinging said seal members to and from sealing position mounted on said door seal members, and keepers on said door with which said latches have camming engagement to clampingly urge the seal members into sealing engagement with the door and with the door frame members and the sill seal member against the sill.

9. A door assembly comprising side frame members, tracks disposed at the inner sides of said side frame members and in laterally spaced relation to the inner edges thereof, a door slidably associated with said tracks, manually adjustable seal members comprising relatively rigid body elements and resilient side frame member and door seal elements supportedly mounted thereon, said seal members being pivotally mounted on the outer sides of said side frame members so that they may be swung outwardly in clearance relation to the opening between said side frame members or to be swung inwardly into the opening and into sealing engagement with the opposed edges of the door frame members and with the door when it is in closed position, latches provided with handles constituting handles for swinging said seal members to and from sealing position mounted on said door seal members, and keepers on said door with which said latches coact.

10. A door assembly comprising side frame members and a sill member, tracks disposed at the inner sides of said side frame members, a door slidably associated with said tracks, seal members comprising relatively rigid body elements provided with resilient side frame member and door engaging seal elements, said seal members being pivotally mounted on said side frame members so that they may be swung to clearance relation to the opening between said side frame members or into the opening between the frame members in sealing engagement therewith and with the door when it is in closed position, a sill seal member mounted on the lower edge of the door to coact with the door sill when the door is closed, latches on said door seal member, and keepers on said door with which said latches coact to urge the seal members into sealing engagement with the door, and with the door frame members and the sill seal member against the sill.

11. A door assembly comprising side frame members and a sill member, tracks disposed at the inner sides of said side frame members, a door slidably associated with said tracks, seal members comprising relatively rigid body elements provided with resilient side frame member and door engaging seal elements, said seal members being pivotally mounted on said side frame members so that they may be swung to clearance relation to the opening between said side frame members or into the opening between the frame members in sealing engagement therewith and with the door when it is in closed position, latches on said door seal member, and keepers on said door with which said latches coact to urge the seal members into sealing engagement with the door and with the door frame members.

12. The combination of side frame members spaced to provide an opening therebetween, a closure member for said opening operatively associated with said frame members to close the opening when the closure member is in closed position, manually adjustable seal members comprising relatively rigid body elements and resilient side frame members and closure seal elements supportedly mounted thereon, said seal members being pivotally mounted on said side frame members so that they may be manually swung outwardly in clearance relation to the opening between said side frame members or to be swung into the opening into sealing engagement with said frame members and with the closure member when it is in closed position, latches provided with handles for swinging said seal members to and from sealing position mounted on said closure member, and keepers on said closure members with which said latches may be engaged to clampingly urge the seal members into sealing engagement with the closure and the frame members.

13. The combination of side frame members spaced to provide an opening therebetween, a closure member for said opening operatively associated with said frame members to close the opening when the closure member is in closed position, adjustable seal members comprising relatively rigid body elements and resilient side frame members and closure seal elements supportedly mounted thereon, said seal members being pivotally mounted on said side frame members so that they may be swung outwardly in clearance relation to the opening between said side frame members or to be swung into the opening into sealing engagement with said frame members and with the closure member when it is in closed position, and means for securing said seal member in closed position.

14. An upwardly acting door assembly comprising side frame members, a door comprising a plurality of hingedly connected sections, tracks comprising vertical and horizontal sections and curved intermediate sections therefor, the vertical sections being disposed at the inner sides of said frame members, said door sections being provided with rollers coacting with said track to slidably support the door including rollers disposed closely adjacent the bottom edge of the bottom section of the door, a counterbalance for said door including cables, brackets for connecting the cables to the door mounted on the lower section thereof; and having laterally projecting angled arms disposed in the plane of the door section, roller spindle bearing sleeves supportedly engaged with said arms, said cables being engaged with said sleeves, and seal members swingably mounted on said frame members to engage the outer side of the door and the lateral edges of the frame members, said cables being disposed between the rollers and the seal members when the seal members are in closed door engaging position.

15. A bracket adapted for attaching a counter-balancing cable to an upwardly acting door comprising hingedly connected sections, the lower section of which is provided with a track engaging roller having a spindle, the bracket body having spaced parallel plates engageable with opposite sides of the door and connected by a central web engageable over the side edge of the door and being provided with a laterally projecting upwardly facing angular first arm bent outwardly and upwardly from said web in the plane of the door, a spindle bearing sleeve supportedly engaged with and extending between said arm and the web of the bracket and providing a cable counterbalance attaching member, and said bracket having a second arm disposed vertically above said first arm to limit forward swinging movement of the cable attached to said sleeve.

16. A bracket adapted for attaching a counter-balancing cable to an upwardly acting door comprising hingedly connected sections, the lower section of which is provided with a track engaging roller having a spindle, the bracket body having spaced parallel plates engageable with opposite sides of the door and connected by a central web engageable over the side edge of the door and being provided with a laterally projecting upwardly facing angular first arm bent outwardly and upwardly from said web in the plane of the door, and a spindle bearing sleeve supportedly engaged with and extending between said arm and the web of the bracket and providing a cable counterbalance attaching member.

References Cited in the file of this patent

UNITED STATES PATENTS

| | | |
|---|---|---|
| 1,510,287 | Mack et al. | Sept. 30, 1924 |
| 1,824,212 | Johnson | Sept. 22, 1931 |
| 2,008,959 | Johnson | July 23, 1935 |
| 2,226,017 | Pixley | Dec. 24, 1940 |
| 2,258,371 | Wernert | Oct. 7, 1941 |
| 2,263,806 | Hammerl | Nov. 25, 1941 |
| 2,749,582 | Beck | June 12, 1956 |

FOREIGN PATENTS

| | | |
|---|---|---|
| 332,093 | Great Britain | July 17, 1930 |